US012597644B2

(12) United States Patent
Horikoshi et al.

(10) Patent No.: US 12,597,644 B2
(45) Date of Patent: Apr. 7, 2026

(54) BATTERY

(71) Applicant: MURATA MANUFACTURING CO., LTD., Kyoto (JP)

(72) Inventors: Yoshiichi Horikoshi, Kyoto (JP); Daiki Nishiie, Kyoto (JP); Hideaki Tokugawa, Kyoto (JP); Masahiro Otsuka, Kyoto (JP); Naoto Akizuki, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 598 days.

(21) Appl. No.: 17/481,539

(22) Filed: Sep. 22, 2021

(65) Prior Publication Data

US 2022/0006129 A1 Jan. 6, 2022

Related U.S. Application Data

(63) Continuation of application No. PCT/JP2020/009652, filed on Mar. 6, 2020.

(30) Foreign Application Priority Data

Mar. 29, 2019 (JP) ................................. 2019-068148

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0413* (2013.01); *H01M 10/0564* (2013.01);
(Continued)

(58) Field of Classification Search
None
See application file for complete search history.

(56) References Cited

U.S. PATENT DOCUMENTS 5,478,362 A * 12/1995 Oota ....................... H01M 6/10
429/94
6,443,999 B1 * 9/2002 Cantave .................. H01M 6/10
429/247
(Continued)

FOREIGN PATENT DOCUMENTS

EP 2874225 A1 * 5/2015 ........ H01M 10/0404
JP 2009146792 A * 7/2009
(Continued)

OTHER PUBLICATIONS

Espacenet machine translation of JP-2013164967-A (Year: 2013).*
(Continued)

*Primary Examiner* — Haroon S. Sheikh
(74) *Attorney, Agent, or Firm* — K&L Gates LLP

(57) ABSTRACT

A battery includes an electrode body having a winding structure, and an electrolyte solution. The electrode body and the electrolyte solution are accommodated in a case. The electrode body includes: a positive electrode that includes a positive electrode lead, and has a belt shape; a negative electrode that includes a negative electrode lead, and has the belt shape; and a separator that is provided between the positive electrode and the negative electrode, and has the belt shape. The positive electrode lead and the negative electrode lead are led out from a first end face of the electrode body. The electrode body includes a molded part of the separator, and the molded part protrudes from a second end face.

8 Claims, 5 Drawing Sheets

(51) Int. Cl.

| | |
|---|---|
| *H01M 10/0564* | (2010.01) |
| *H01M 50/103* | (2021.01) |
| *H01M 50/533* | (2021.01) |
| *H01M 50/534* | (2021.01) |
| *H01M 50/586* | (2021.01) |
| *H01M 50/595* | (2021.01) |

(52) U.S. Cl.

CPC ....... *H01M 50/103* (2021.01); *H01M 50/533* (2021.01); *H01M 50/534* (2021.01); *H01M 50/586* (2021.01); *H01M 50/595* (2021.01)

(56) References Cited

U.S. PATENT DOCUMENTS

| | | | | | |
|---|---|---|---|---|---|
| 2007/0154790 A1* | 7/2007 | Jeung | ............... | H01M 10/0587 | |
| | | | | | 429/94 |
| 2010/0216027 A1* | 8/2010 | Fujii | ...................... | H01G 11/52 | |
| | | | | | 29/25.03 |
| 2011/0059343 A1* | 3/2011 | McKinney | .......... | H01M 50/429 | |
| | | | | | 429/94 |
| 2011/0151307 A1* | 6/2011 | Hwang | ............ | H01M 10/0413 | |
| | | | | | 429/129 |

| | | | | | |
|---|---|---|---|---|---|
| 2014/0315061 A1* | 10/2014 | Wang | ................ | H01M 10/0587 | |
| | | | | | 429/94 |
| 2017/0117572 A1* | 4/2017 | Ichikawa | .......... | H01M 10/0436 | |
| 2023/0299435 A1* | 9/2023 | Tong | ................. | H01M 10/0587 | |
| | | | | | 429/94 |

FOREIGN PATENT DOCUMENTS

| | | | | |
|---|---|---|---|---|
| JP | 2010020956 | A | * | 1/2010 |
| JP | 2013164967 | A | * | 8/2013 |
| JP | 2016115410 | A | * | 6/2016 |

OTHER PUBLICATIONS

Espacenet machine translation of JP-2010020956-A (Year: 2010).*

Espacenet machine translation of JP-2016115410-A (Year: 2016).*

Espacenet machine translation of JP-2009146792-A (Year: 2009).*

Chinese Office Action issued Jan. 10, 2024in corresponding Chinese Application No. 202080025575.2.

Japanese Office Action issued May 10, 2022 in corresponding Japanese Application No. 2021-511295.

International Search Report for Application No. PCT/JP2020/009652, dated Jun. 2, 2020.

* cited by examiner

BATTERY

CROSS REFERENCE TO RELATED APPLICATIONS

The present application is a continuation of PCT patent application no. PCT/JP2020/009652, filed on Mar. 6, 2020, which claims priority to Japanese patent application no. JP2019-068148 filed on Mar. 29, 2019, the entire contents of which are being incorporated herein by reference.

BACKGROUND

In recent years, many types of portable electronic devices such as smartphones or laptops have been proposed, and have been reduced in size and weight. As a portable power supply for these electronic devices, a nonaqueous electrolyte secondary battery (for example, a lithium-ion secondary battery) has been used. As an example of a secondary battery, a configuration including an electrode body in which a positive electrode and a negative electrode have been laminated with a separator interposed therebetween is known.

SUMMARY

The present disclosure focuses on an amount of protrusion of an electrode body of a separator from both end faces, and achieves a battery that improves dropping resistance of the battery in a state where a bottom side (a side opposite to a tab) in a winding axis direction of the electrode body faces downward, and causes an electrode plate to be satisfactorily impregnated with an electrolyte solution.

It is an object of the present disclosure to provide a battery that can improve dropping resistance of the battery, and causes an electrode plate to be satisfactorily impregnated with an electrolyte solution.

According to an embodiment of the present technology, a battery is provided. The battery includes an electrode body having a winding structure, and an electrolyte solution. The electrode body and the electrolyte solution are accommodated in a case. The electrode body includes: a positive electrode that includes a positive electrode lead, and has a belt shape; a negative electrode that includes a negative electrode lead, and has the belt shape; and a separator that is provided between the positive electrode and the negative electrode, and has the belt shape. The positive electrode lead and the negative electrode lead are led out from a first end face of the electrode body. The electrode body includes a molded part of the separator, and the molded part protrudes from a second end face. The electrode body satisfies Formula 1 and Formula 2:

$$0.08 \leq W2/Ws \leq 0.17; \text{ and} \quad \text{(Formula 1)}$$

$$0.20 \leq W4/W2 \leq 0.53. \quad \text{(Formula 2)}$$

In Formula 1 and Formula 2, W2 is the amount of protrusion from the negative electrode of the separator on a side of the second end face, Ws is a width of the separator, and W4 is a size from an end of the negative electrode to a bottom part excluding a thickness of a tape of the electrode body.

According to at least one embodiment described herein, a battery that can improve dropping resistance of the battery in a state where a bottom side (a side opposite to an electrode lead) in a winding axis direction faces downward, and causes an electrode plate to be satisfactorily impregnated with an electrolyte solution can be achieved.

It should be understood that the effect described here is not necessarily restrictive, and any of the effects described in the present disclosure or effects that are different from the effects described in the present disclosure may be exhibited.

DETAILED DESCRIPTION

The present disclosure is described below with reference to the drawings. It should be understood that an embodiment and the like that are described below are preferred specific examples of the present disclosure, and the content of the present disclosure is not limited to the embodiment and the like. Furthermore, effects described herein are merely examples, and are not restrictive. Moreover, it is not denied that effects that are different from the effects described as examples are exhibited.

Figure 1:
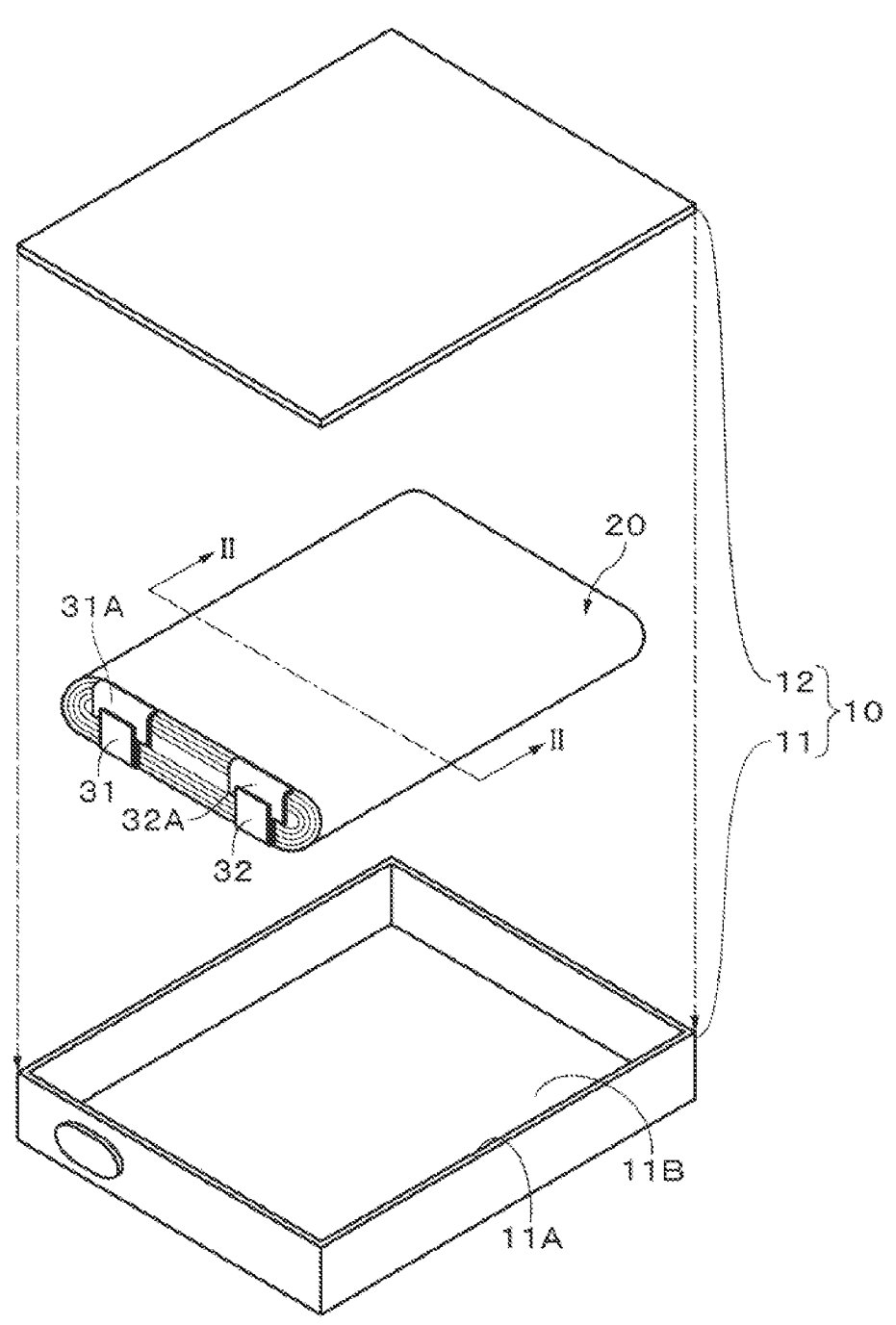
FIG. 1 is an exploded perspective view illustrating an example of a configuration of a nonaqueous electrolyte secondary battery according to an embodiment of the present disclosure.

First, an example of a configuration of a nonaqueous electrolyte secondary battery (hereinafter simply referred to as a "battery or a secondary battery") according to an embodiment of the present disclosure is described with reference to FIG. 1 and FIG. 2. The battery has a flat shape, as illustrated in FIG. 1. The battery includes an electrode body 20 obtained by laminating and winding a positive electrode, a negative electrode, and a separator. A length between one end face and another end face in a winding axis direction of the electrode body 20 is referred to as a width.

A positive electrode lead 31 and a negative electrode lead 32 extend from one end face of the electrode body 20. A side of one end face from which the positive electrode lead 31 and the negative electrode lead 32 are led out is referred to as a top, and a side of another end face is referred to as a bottom.

The electrode body 20, an electrolyte solution (not illustrated) serving as an electrolyte, and the electrode body 20 and the electrolyte solution that have been described above are housed in a case 10 serving as a housing body. In a plan view of the battery from a direction perpendicular to a principal face of the battery, the battery has a rectangular shape.

The case 10 is a metal can, and includes at least one of steel, aluminum alloy steel, and stainless steel. For example, the case 10 includes iron (Fe) or stainless steel. A surface of the metal can may be plated with nickel (Ni) or the like. The case 10 includes a housing 11 and a lid 12. The housing 11 includes a periphery 11A, and a recess 11B that is recessed from the periphery 11A.

The recess 11B houses the electrode body 20. A depth of the recess 11B is roughly the same as a thickness of the electrode body 20. The lid 12 covers a cavity of the recess 11B. A periphery of the lid 12 and the periphery 11A of the housing 11 overlap each other. The periphery 11A of the housing 11 and the periphery of the lid 12 that overlap each other are joined by welding, an adhesive, or the like.

Each of the positive electrode lead 31 and the negative electrode lead 32 extends from an inside to an outside of the case 10, and are linearly led out, for example, in the same direction. Each of the positive electrode lead 31 and the negative electrode lead 32 includes, for example, a metallic material such as Al, Cu, Ni, or stainless steel, and has a thin plate shape or the like.

A resin layer (a close-contact film) 31A or 32A for securing insulation is inserted into at least one of or both the case 10 and the negative electrode lead 32. The resin layer 31A or 32A includes a material having insulation with respect to the positive electrode lead 31 and the negative electrode lead 32, for example, polyolefin resin such as polyethylene, polypropylene, modified polyethylene, or modified polypropylene.

Figure 2:
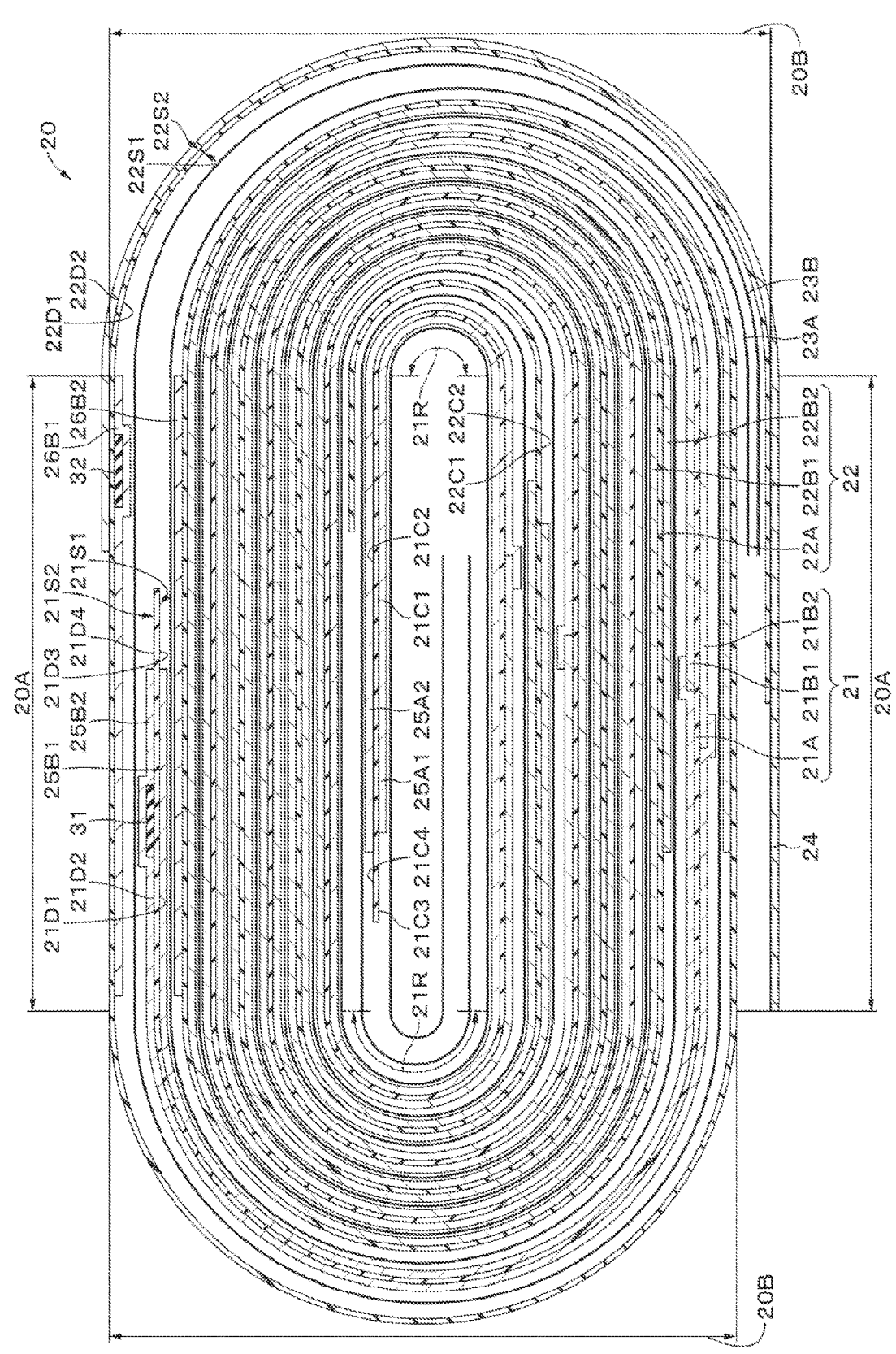
FIG. 2 is a sectional view along line II-II in FIG. 1.

As illustrated in FIG. 2, the electrode body 20 includes a pair of flat parts 20A that face each other, and a pair of curved parts 20B that are provided between this pair of flat parts 20A and face each other. The electrode Body 20 includes a positive electrode 21 having a belt shape, a negative electrode 22 having a belt shape, two separators 23A and 23B having a belt shape, insulating members 25A1, 25A2, 25B1, and 25B2 that are provided in the positive electrode 21, and insulating members 26B1 and 26B2 that are provided in the negative electrode 22.

The separators 23A and 23B are alternately provided between the positive electrode 21 and the negative electrode 22. The electrode body 20 has a configuration in which the positive electrode 21 and the negative electrode 22 are laminated with the separator 23A or the separator 23B interposed therebetween, and are wound in a longitudinal direction to have a flat shape and a spiral shape. The electrode body 20 is wound in such a way that the positive electrode 21 serves as an innermost peripheral electrode and the negative electrode 22 serves as an outermost peripheral electrode. The negative electrode 22 serving as an outermost peripheral electrode is fixed by using an insulating tape 24 serving as an insulating later. The insulating tape 24 also has a function of a winding stop tape. The positive electrode 21, the negative electrode 22, and the separators 23A and 23B are impregnated with an electrolyte solution.

The positive electrode 21 includes a positive electrode current collector 21A including an inside face (a first face) 21S1 and an outside face (a second face) 21S2, a positive electrode active material layer 21B1 that is provided on the inside face 21S1 of the positive electrode current collector 21A, and a positive electrode active material layer 21B2 that is provided on the outside face 21S2 of the positive electrode current collector 21A. Herein, an "inside face" means a face that is located on a side of a winding center, and an "outside face" means a face that is located on a side opposite to the winding center.

The inside face 21S1 at an inner-peripheral-side end of the positive electrode 21 is provided with a positive-electrode-current-collector exposed part 21C1 in which the positive electrode active material layer 21B1 is not provided, and the inside face 21S1 of the positive electrode current collector 21A is exposed. The outside face 21S2 at the inner-peripheral-side end of the positive electrode 21 is provided with a positive-electrode-current-collector exposed part 21C2 in which the positive electrode active material layer 21B1 is not provided, and the outside face of the positive electrode current collector 21A is exposed. A length in a winding direction of the positive-electrode-current-collector exposed part 21C1 is, for example, greater than a length in the winding direction of the positive-electrode-current-collector exposed part 21C2 by about one round. Stated another way, the positive electrode 21 is provided with a single-sided electrode part in which only the positive electrode active material layer 21B2 of the positive electrode active material layer 21B1 and the positive electrode active material layer 21B2 is provided in the positive electrode current collector 21A, for example, by about one round.

The inside face 21S1 at an outer-peripheral-side end of the positive electrode 21 is provided with a positive-electrode-current-collector exposed part 21D1 in which the positive electrode active material layer 21B1 is not provided, and the inside face 2151 of the positive electrode current collector 21A is exposed. The outside face 21S2 at the outer-peripheral-side end of the positive electrode 21 is provided with a positive-electrode-current-collector exposed part 21D2 in which the positive electrode active material layer 21B2 is not provided, and the outside face 21S2 of the positive electrode current collector 21A is exposed. A portion that corresponds to the flat part 20A in the positive-electrode-current-collector exposed part 21D2 is connected to the positive electrode lead 31. A length in the winding direction of the positive-electrode-current-collector exposed part 21D1 is, for example, roughly the same as a length in the winding direction of the positive-electrode-current-collector exposed part 21D2. The positive electrode current collector 21A includes, for example, metallic foil such as aluminum foil, nickel foil, or stainless foil.

The positive electrode 21 includes, at the inner-peripheral-side end, a single-sided electrode part in which the inside face 21S1 is exposed so that the positive-electrode-current-collector exposed part 2101 is formed, and the positive electrode active material layer 21B2 is formed on the outside face 21S2. This single-sided electrode part includes a curved part. A region 21R that corresponds to the curved part of the single-sided electrode part in the positive-electrode-current-collector exposed part 21C1 is covered with the insulating member 25A1.

The positive electrode active material layers 21B1 and 21B2 include a positive electrode active material that can occlude and release lithium. The positive electrode active material layers 21B and 21B2 may further include at least one of binder and a conductive agent, as needed.

An appropriate example of the positive electrode active material is a lithium-containing compound such as lithium oxide, lithium phosphorus oxide, lithium sulfide, or an intercalation compound containing lithium, and a mixture of two or more of them may be used. In order to increase energy density, a lithium-containing compound containing lithium, a transition metal element, and oxygen is preferable. Examples of such a lithium-containing compound include lithium composite oxide having a lamellar rock salt type structure expressed by Formula (A), lithium composite phosphate having an olivine type structure expressed by Formula (B), and the like. It is more preferable that the lithium-containing compound contain at least one selected from the group consisting of Co, Ni, Mn, and Fe. Examples of such a lithium-containing compound include lithium composite oxide having a lamellar rock salt type structure expressed by Formula (C), Formula (D), or Formula (E), lithium composite oxide having a spinel type structure expressed by Formula (F), lithium composite phosphate having an olivine type structure expressed by Formula (G), and the like, and specific examples include $LiNi_{0.50}Co_{0.50}Mn_{0.30}O_2$, $LiCoO_2$, $LiNiO_2$, $LiNiaCo_{1-a}O_2$ ($0<a<1$), $LiMn_2O_4$, $LiFePO_4$, and the like.

$Li_pNi_{(1-q-r)}Mn_qMn_rM1_rO_{(2-y)}$, $X_z$ . . . (A) (where in Formula (A), M1 indicates at least one selected from Group 2 elements to Group 15 elements excluding Ni and Mn. X indicates at least one selected from the group consisting of Group 16 elements and Group 17 elements excluding oxygen. p, q, y, or z is a value within a range in which $0 \leq p \leq 1.5$, $0 \leq q \leq 1.0$, $0 \leq r \leq 1.0$, $-0.10 \leq y \leq 0.20$, or $0 \leq z \leq 0.2$).

$Li_aM2_bPO_4$ . . . (B) (where in Formula (B), M2 is indicates at least one selected from Group 2 elements to Group 15 elements. a or b is a value within a range in which $0 \leq a \leq 2.0$ or $0.5 \leq b \leq 2.0$.)

$Li_fMn_{(1-g-h)}Ni_gM3_hO_{(2-j)}F_k$ . . . (C) (where in Formula (C), M3 indicates at least one selected from the group consisting of Co, Mg, Al, B, Ti, V, Cr, Fe, Cu, Zn, Zr, Mo, Sn, Ca, Sr, and W. f, g, h, j, or k is a value within a range in which $0.8 \leq f \leq 1.2$, $0<g<0.5$, $0 \leq h \leq 0.5$, $g+h<1$, $-0.1 \leq j \leq 0.2$, or $0 \leq k \leq 0.1$. It should be understood that a composition of lithium varies according to a charged/discharged state, and a value off indicates a value in a fully discharged state.)

$Li_mNi_{(1-n)}M4_nO_{(2-p)}F_q$ . . . (where in Formula (D), M4 indicates at least one selected from the group consisting of Co, Mn, Mg, Al, B, Ti, V Cr, Fe, Cu, Zn, Mo, Sn, Ca, Sr, and W. m, n, p, or q is a value within a range in which $0.8 \leq m \leq 1.2$, $0.005 \leq n \leq 0.5$, $-0.1 \leq p \leq 0.2$, or $0 \leq q \leq 0.1$. It should be understood that a composition of lithium varies according to a charged/discharged state, and a value of m indicates a value in a fully discharged state.)

$Li_rCo_{(1-s)}M5_sO_{(2-t)}F_u$ . . . (where in Formula (E), M5 indicates at least one selected from the group consisting of Ni, Mn, Mg, Al, B, Ti, V, Cr, Fe, Cu, Zn, Mo, Sn, Ca, Sr, and W. r, s, t, or u is a value within a range in which $0.8 \leq r \leq 1.2$, $0 \leq s \leq 0.5$, $-0.1 \leq t \leq 0.2$, or $0 \leq u \leq 0.1$. It should be understood that a composition of lithium varies according to a charged/discharged state, and a value of r indicates a value in a fully discharged state.)

$Li_vMn_{2-w}M6_wO_xF_y$ . . . (F) (where in Formula (F), M6 indicates at least one selected from the group consisting of Co, Ni, Mg, Al, B, Ti, V, Cr, Fe, Cu, Zn, Mo, Sn, Ca, Sr, and W. v, w, x, or y is a value within a range in which $0.9 \leq v \leq 1.1$, $0 \leq w \leq 0.6$, $3.7 \leq x \leq 4.1$, or $0 \leq y \leq 0.1$. It should be understood that a composition of lithium varies according to a charged/discharged state, and a value of v indicates a value in a fully discharged state.)

$Li_zM7PO_4$ . . . (G) (wherein in Formula (G), M7 indicates at least one selected from the group consisting of Co, Mg, Fe, Ni, Mg, Al, B, Ti, V, Nb, Cu, Zn, Mo, Ca, Sr, W, and Zr. z is a value within a range in which $0.9 \leq z \leq 1.1$. It should be understood that a composition of lithium varies according to a charged/discharged state, and a value of z indicates a value in a fully discharged state.)

As a positive electrode active material that can occlude and release lithium, an inorganic compound that does not contain lithium, such as $MnO_2$, $V_2O_5$, $V_6O_{13}$, S, or MoS can also be used in addition to the above.

The positive electrode active material that can occlude and release lithium may be a material that is different from the above. Furthermore, arbitrary two or more of the positive electrode active materials described above as an example may be mixed.

As the binder, for example, at least one selected from the group consisting of polyvinylidene fluoride, polytetrafluoroethylene, polyacrylonitrile, styrene-butadiene rubber, carboxymethyl cellulose, copolymer principally containing one of these resin materials, and the like can be used.

As the conductive agent, for example, at least one carbon material selected from the group consisting of graphite, carbon fiber, carbon black, acetylene black, Ketjen black, a carbon nanotube, graphene, and the like can be used. It should be understood that the conductive agent may be any material having conductivity, and is not limited to a carbon material. For example, as the conductive agent, a metallic material, a conductive polymer material, or the like may be used. Furthermore, examples of a shape of the conductive agent include a granular shape, a scaly shape, a hollow shape, a needle shape, a cylindrical shape, and the like, but the shape of the conductive agent is not particularly limited to these shapes.

The negative electrode 22 includes a negative electrode current collector 22A that includes an inside face (a first face) 22S1 and an outside face (a second face) 22S2, a negative electrode active material layer 22B1 that is provided on the inside face 22S1 of the negative electrode current collector 22A, and a negative electrode active material layer 22B2 that is provided on the outside face 22S2 of the negative electrode current collector 22A.

The inside face 22S1 at an inner-peripheral-side end of the negative electrode 22 is provided with a negative-electrode-current-collector exposed part 22C1 in which the negative electrode active material layer 22B1 is not provided, and the inside face 22S1 of the positive electrode current collector 21A is exposed. The outside face 22S2 at the inner-peripheral-side end of the negative electrode 22 is provided with a positive-electrode-current-collector exposed part 21C2 in which the negative electrode active material layer 22B2 is not provided, and the outside face of the negative electrode current collector 22A is exposed. A length in the winding direction of the negative-electrode-current-collector exposed part 22C1 is, for example, roughly the same as a length in the winding direction of the positive-electrode-current-collector exposed part 21C2.

The inside face 22S1 at an outer-peripheral-side end of the negative electrode 22 is provided with a negative-electrode-current-collector exposed part 22D1 in which the negative electrode active material layer 22B1 is not provided, and the inside face 22S1 of the positive electrode current collector 21A is exposed. The outside face 22S2 at the outer-peripheral-side end of the negative electrode 22 is provided with a negative-electrode-current-collector exposed part 22D2 in which the negative electrode active material layer 22B2 is not provided, and the outside face 22S2 of the negative electrode current collector 22A is exposed. A portion that corresponds to the flat part 20A in the negative-electrode-current-collector exposed part 22D1 is connected to the negative electrode lead 32. As described above, the negative electrode lead 32 is provided at the outer-peripheral-side end of the negative electrode 22, and therefore, as described above, the negative lead 32 extends from an inside to an outside of the case 10, and can be linearly led out. It should be understood that the positive electrode lead 31 and the negative electrode lead 32 are provided on a side of the same flat part 20A.

A length in the winding direction of the negative-electrode-current-collector exposed part 22D1 is greater than a length in the winding direction of the negative-electrode-current-collector exposed part 22D2 by about one round. Stated another way, the negative electrode 22 is provided with a single-sided electrode part in which only the negative electrode active material layer 22B1 of the negative electrode active material layer 22B1 and the negative electrode active material layer 22B2 is provided in the negative electrode current collector 22A, for example, by about one round.

An outermost periphery of the negative electrode 22 is provided with a portion where both the inside face 22S1 and the outside face 22S2 of the negative electrode current collector 22A are exposed (that is, a portion where the negative-electrode-current-collector exposed part 22D1 and the negative-electrode-current-collector exposed part 22D2 are provided on both sides of the positive electrode 21), for example, by about one round. This causes the negative-electrode-current-collector exposed part 22D2 and an inside face of the case 10 to be in electrical contact with each other.

The negative electrode current collector 22A includes, for example, metallic foil such as copper foil, nickel foil, or stainless foil. The negative electrode active material layers 22B1 and 22B2 include a negative electrode active material that can occlude and release lithium. The negative electrode active material layers 22B1 and 22B2 may further include at least one of binder and a conductive agent, as needed.

An example of the negative electrode active material is a carbon material such as non-graphitizable carbon, highly graphitizable carbon, graphite, pyrolytic carbon, coke, vitreous carbon, an organic polymer compound fired body, carbon fiber, or activated carbon. Among the above, examples of coke include pitch coke, needle coke, petroleum coke, and the like. The organic polymer compound fired body is a material obtained by firing and carbonizing a polymer material, such as phenol resin or furan resin, at an appropriate temperature, and some organic polymer compound fired bodies are classified as non-graphitizable carbon or highly graphitizable carbon. These carbon materials are preferable, because a change in a crystal structure at the time of charging/discharging is very small, a high charging/discharging capacity can be obtained, and satisfactory cycle characteristics can be obtained. In particular, graphite is preferable, because an electrochemical equivalent is large, and a high energy density can be obtained. Furthermore, non-graphitizable carbon is preferable, because satisfactory cycle characteristics can be obtained.

Moreover, a material having a low charging/discharging potential and specifically, a material having a charging/discharging potential that is similar to a charging/discharging potential of lithium metal are preferable, because an increase in energy density in a battery can be achieved.

As the binder, a material that is similar to a material in the positive electrode active material layer 21B1 or 21B2 can be used.

As the conductive agent, a material that is similar to a material in the positive electrode active material layer 21B1 or 21B2 can be used.

The electrolyte solution is what is called a nonaqueous electrolyte solution, and includes an organic solvent (a nonaqueous solvent) and electrolyte salt dissolved in this organic solvent. The electrolyte solution may include publicly known additives in order to improve battery characteristics. It should be understood that instead of the electrolyte solution, an electrolyte layer that includes the electrolyte solution and a polymer compound serving as a holder that holds this electrolyte solution may be used. In this case, the electrolyte layer may be gelatinous.

As the organic solvent, cyclic carbonic acid ester, such as ethylene carbonate or propylene carbonate, can be used. It is preferable that one of ethylene carbonate and propylene carbonate, and in particular, a mixture of both be used. This is because cycle characteristics can be further improved.

Furthermore, it is preferable that as the organic solvent, a mixture of these types of cyclic carbonic acid ester and chain carbonic acid ester, such as diethyl carbonate, dimethyl carbonate, ethyl methyl carbonate, or methylpropyl carbonate, be used. This is because high ion conductivity can be obtained.

Moreover, it is preferable that the organic solvent include 2,4-difluoroanisole or vinylene carbonate. This is because 2,4-difluoroanisole can further improve a charging/discharging capacity, and vinylene carbonate can further improve cycle characteristics. Therefore, it is preferable that a mixture of these be used, because the charging/discharging capacity and the cycle characteristics can be further improved.

In addition to the above, examples of the organic solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolan, methyl acetate, methyl propionate, acetonitrile, glutaronitrile, adiponitrile, methoxyacetonitrile, 3-methoxypropionitrile, N,N-dimethylformamide, N-methylpyrrolidine N-methyloxazolidinone, N,N-dimethylimidazolidinone, nitromethane, nitroethane, sulfolane, dimethyl sulfoxide, trimethyl phosphate, and the like.

It should be understood that in some cases, a compound obtained by substituting fluorine for at least part of hydrogen of the organic solvent described above can improve reversibility of electrode reaction according to types of electrodes to be combined, and therefore such a compound is preferable in some cases.

An example of electrolyte salt is lithium salt, and a single type of lithium salt may be used, or a mixture of two or more types of lithium salt may be used. Examples of lithium salt include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, difluoro[oxalato-O,O'] lithium borate, lithium bisoxalate borate, LiBr, and the like.

Among the above, $LiPF_6$ is preferable, because high ion conductivity can be obtained, and cycle characteristics can be further improved.

In order to avoid electrical contact between the positive-electrode-current-collector exposed part and the negative-electrode-current-collector exposed part, insulating members (insulating tapes) 25A1, 25A2, 25B1, 25B2, 26B1, and 26B2 are included. The insulating members 25A1, 25A2, 25B1, and 25B2 are insulating members that are provided in the positive electrode. The insulating members 26B1 and 26B2 are insulating members that are provided in the negative electrode. The insulating members 25A1, 25A2, 25B1, 25B2, 26B1, and 26B2 have, for example, a rectangular film shape, and have an adhesive surface on one face. More specifically, the insulating members 25A1, 25A2, 25B1, 25B2, 26B1, and 26B2 include a substrate and an adhesive layer that is provided on the substrate.

As illustrated in FIG. 2, in an embodiment of the present disclosure, in the flat part 20A of the electrode body 20, the negative electrode lead 22 is connected to the inside face (the negative-electrode-current-collector exposed part 22D1) of the negative electrode current collector 22A that is located at an outermost periphery, for example, by welding. A portion near one end of the insulating tape 24 covers a region of the outside face that faces a region of the inside face where the negative electrode lead 32 is attached. It is assumed that a width of the insulating tape 24 is roughly equal to a width of a portion that is inserted into the electrode body 20 of the negative electrode lead 32. The insulating tape 24 covers a curved part 20R on one side of the electrode body 20 and the negative-electrode-current-collector exposed part of another flat part (a flat part on a lower side in FIG. 2) 20A.

Such a configuration is employed in order to cover, with the insulating tape 24, a welding mark (unevenness) region that has been generated on the outside face of the negative electrode current collector 22A as a result of welding of the negative electrode lead 32. Accordingly, the negative electrode current collector 22A and an inner surface of the case 10 can be in stable contact with each other, variations in battery resistance can be reduced, and satisfactory heat dissipation can be achieved. Moreover, a risk of an internal short circuit due to the falling of metal powder generated in welding and metal melting/elution can be reduced.

An outline of a method for manufacturing the secondary battery described above is described. The positive electrode 21, the separators 23A and 23B, and the negative electrode 22 are laminated, the positive electrode lead 31 is joined to the positive electrode 21, the negative electrode lead 32 is joined to the negative electrode 22, and a laminate structure that has not yet been wound and has a flat shape is formed.

Then, after an insulating member is bonded, the laminate structure is wound to have a slightly flat spiral shape. Moreover, a pressing force is applied to the laminate structure from the outside, and the laminate structure is further flattened and thinned. An outermost peripheral face of the laminate structure is covered with the insulating tape 24. Therefore, the negative electrode 22 (an end of the negative electrode current collector 22A)) is fixed. Moreover, a protruding part of the separator is molded (hereinafter appropriately referred to as forming), and a molded part is formed on a bottom side.

Next, the electrode body 20 is housed inside the case 10, and an upper side of the electrode body 20 is covered with the lid 12, and is fixed. Finally, an electrolyte solution is poured into the case 10 from an electrolyte solution pouring hole, the separators 23A and 23B are impregnated with the electrolyte solution, and the electrolyte solution pouring hole is sealed with a sealing member. By doing this, the secondary battery illustrated in FIG. 1 and FIG. 2 is completed.

Figure 3A:
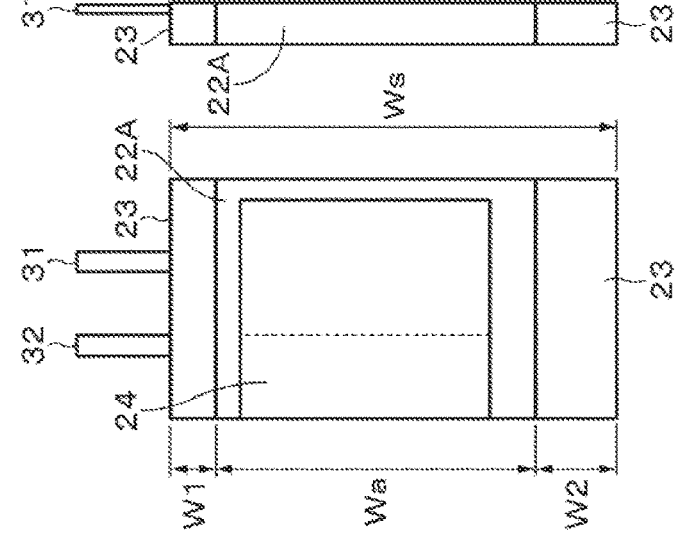
FIG. 3A to FIG. 3C are plan views and side views that are used in the description of an embodiment of a secondary battery according to the present disclosure.

An embodiment of the present disclosure is described with reference to FIG. 3 and FIG. 4. FIG. 3 is plan views and side views for explaining states before and after forming, and the resin layers 31A and 32A are omitted for simplification. Moreover, FIG. 4 is schematic sectional views for explaining states before and after forming. FIG. 4 only illustrates the positive electrode 21, the negative electrode 22, and a separator, and the separators 23A and 23B are not distinguished from each other, and the reference symbol 23 is given.

Figure 4A:
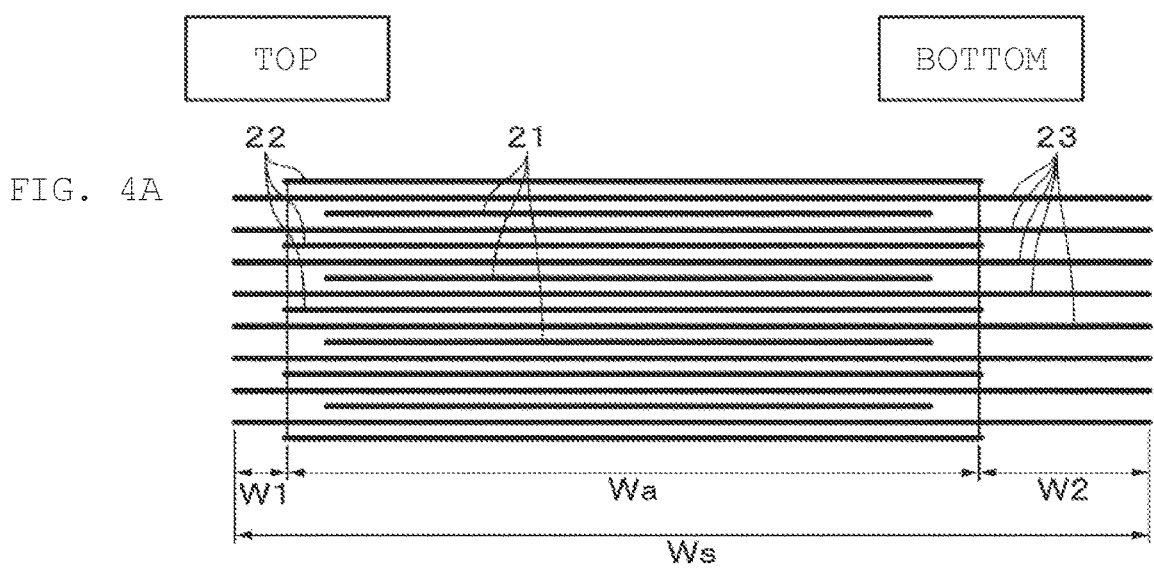
FIG. 4A to FIG. 4C are schematic sectional views that are used in the description of an embodiment of a secondary battery according to an embodiment of the present disclosure.

In the electrode body 20, a length in the winding axis direction (a width) of the negative electrode 22 is greater than a width of the positive electrode 21, and a width of the separator 23 is greater than the width of the negative electrode 22. A size is specified with the width of the negative electrode 22 as a reference. Stated another way, as illustrated in FIG. 3A and FIG. 4A, an amount of protrusion of the separator 23 with respect to one end of the negative electrode 22 on a top side is indicated as W1 (mm), and an amount of protrusion of the separator 23 with respect to another end of the negative electrode 22 on a bottom side is indicated as W2 (mm). When the width of the negative electrode 22 is indicated as Wa (mm), a width Ws of the separator 23 is expressed in such a way that Ws=W1+W2+ Wa.

Before forming, the amount of protrusion W2 from the negative electrode of the separator 23 on the bottom side is greater than the amount of protrusion W1 on the top side (1.7 to 4.4 times), and the amount of protrusion W2 from the negative electrode of the separator 23 on the bottom side is sufficiently great with respect to the width of the separator 23 (0.08 to 0.17 times).

Figure 3B:
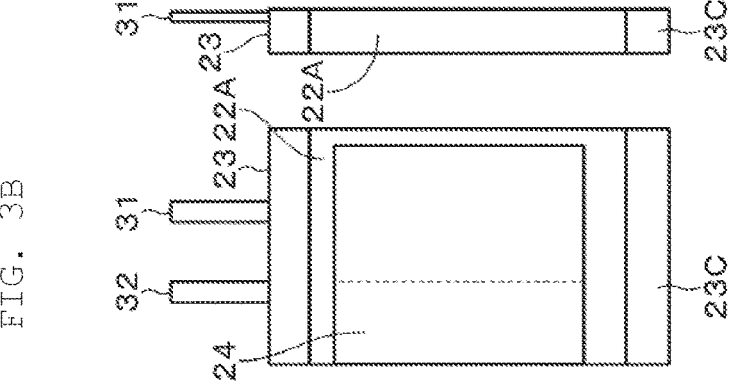
Figure 3C:
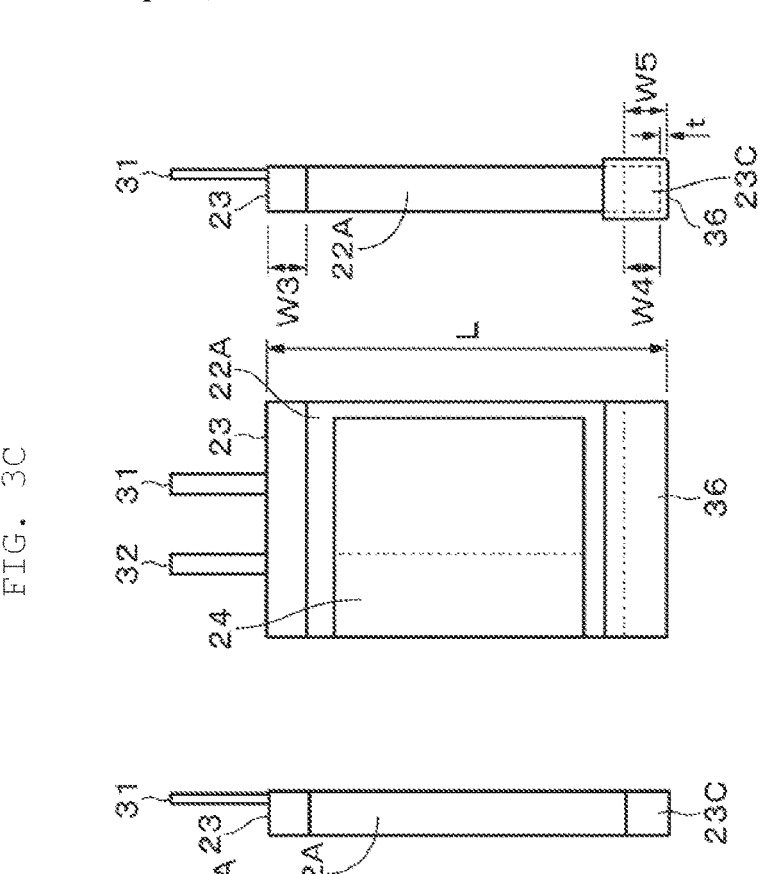
Figure 4B:
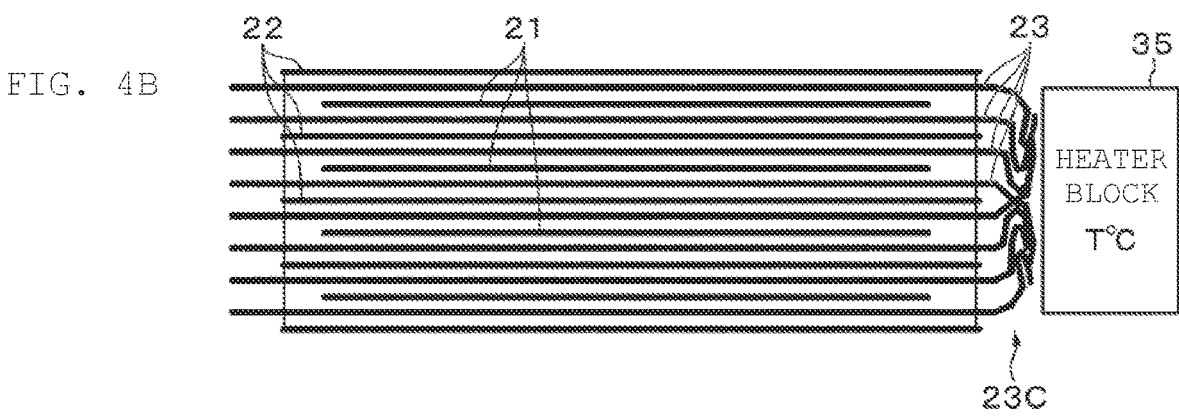
Figure 4C:
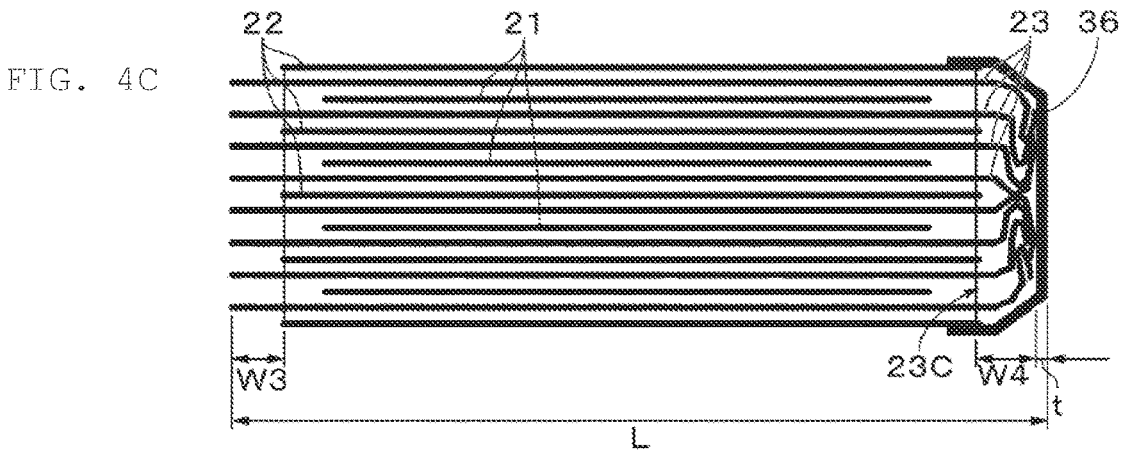

FIG. 3B illustrates the electrode body 20 after forming has been performed on the separator 23 on the bottom side. Due to forming, the amount of protrusion W2 from the negative electrode of the separator 23 on the bottom side is compressed in the winding axis direction, and a molded part 23C is provided on the bottom side. Forming is performed by applying a pressure in the winding axis direction from a bottom to a top by using a heater block 35, for example, as illustrated in FIG. 4B. The pressure is applied in a plurality of stages. A temperature T° C. of the heater block 35 is set to a temperature that does not cause the separator 23 to be melted due to heat. For example, in a case where a melting temperature of the separator 23 ranges from 137° C. to 145° C., the temperature of the heater block 35 is set to a temperature that is lower than the melting temperature by 10° C. to 15° C. At a normal temperature, the separator 23 has a strong elasticity, and is not likely to be transformed, and therefore forming is performed during heating. Furthermore, the separator 23 is not melted or hardened in order to avoid a situation where a cushioning property is lost at the time of dropping a battery and a property of pouring the electrolyte solution deteriorates.

After forming, a surface of the formed part 23C on the bottom side of the separator 23 is covered with an insulating tape (referred to as a bottom tape) 36. The bottom tape 36 prevents the formed part 23C of the separator 23 from being divided into pieces. A width of the molded part 23C after forming is indicated as W4 (mm). A size W5 from a negative electrode end on the bottom side to a bottom part (including the tape) of the electrode body is a value obtained by adding a thickness t of the bottom tape 36 to W4 (W5=W4+t).

In an embodiment of the present disclosure, each size is determined to satisfy a relationship expressed by Formula 1 and Formula 2 after forming:

$$0.08 \leq W2/Ws \leq 0.17; \text{ and} \qquad \text{Formula 1:}$$

$$0.20 \leq W4/W2 \leq 0.53. \qquad \text{Formula 2:}$$

Such a relationship can achieve a battery that can improve dropping resistance of the battery with the bottom side facing downward, and causes an electrode plate to be satisfactorily impregnated with an electrolyte solution. An electrode body having a configuration illustrated in FIG. 3C was formed, the electrode body was housed in an iron can serving as the case 10, and was sealed with a lid, initial charging, discharging, and charging were performed, and a battery was completed. Results of evaluating batteries having different sizes are indicated in Table 1. Evaluation is performed in a bottom dropping test and an impregnation quality test.

TABLE 1

| | Ws Sepa width | Wc Positive electrode width | Wa Negative electrode width | W1 Top-side sepa width | W2 Bottom-side sepa width | W2/Ws Bottom-side sepa width/sepa width | W2/W1 Bottom-side sepa width/top-side sepa width | W3 Top-side sepa width | W4 Bottom-side sepa width | L Electrode body length | W4/W3 Bottom-side sepa width/top-side sepa width | W4/W2 Bottom-side sepa width after forming/before forming | Bottom dropping test Number of accepted pieces (among 30 pieces) | After pouring, no not-yet-impregnated Number of accepted pieces (among 30 pieces) |
|---|---|---|---|---|---|---|---|---|---|---|---|---|---|---|
| Example 1 | 22.6 | 18.8 | 19.9 | 1.0 | 1.7 | 0.08 | 1.70 | 1.0 | 0.9 | 21.8 | 0.90 | 0.53 | 30 | 30 |
| Example 2 | 24.4 | 18.8 | 19.9 | 1.0 | 3.5 | 0.14 | 3.50 | 1.0 | 0.9 | 21.8 | 0.90 | 0.26 | 30 | 30 |
| Example 3 | 25.3 | 18.8 | 19.9 | 1.0 | 4.4 | 0.17 | 4.40 | 1.0 | 0.9 | 21.8 | 0.90 | 0.20 | 30 | 30 |
| Comparative Example 1 | 22.5 | 18.8 | 19.9 | 1.0 | 1.6 | 0.07 | 1.60 | 1.0 | 0.9 | 21.8 | 0.90 | 0.56 | 25 | 30 |
| Comparative Example 2 | 25.4 | 18.8 | 19.9 | 1.0 | 4.5 | 0.18 | 4.50 | 1.0 | 0.9 | 21.8 | 0.90 | 0.20 | 30 | 26 |
| Comparative Example 3 | 25.4 | 18.8 | 19.9 | 1.0 | 4.5 | 0.18 | 4.50 | 1.0 | 1.2 | 22.1 | 1.20 | 0.27 | — | — |
| Comparative Example 4 | 22.6 | 18.8 | 19.9 | 1.0 | 1.7 | 0.08 | 1.70 | 1.0 | 1.0 | 21.9 | 1.00 | 0.59 | 24 | 30 |

Sizes W2 and W4 of a battery are measured as the following.

W5 is a size from a negative electrode end on the bottom side to a bottom part (including a tape) of an electrode body. For example, measurement can be performed by using 3D shape measuring machine VR-3200 from Keyence.

The bottom tape is peeled, and a tap thickness t is measured by using a micrometer. W4 is a size from the negative electrode end to the bottoms part (excluding the tape) of the electrode body, and is calculated in such a way that $W4 = W5 - t$.

Next, a winding stop tape of the electrode body is peeled, and a winding state of the electrode body 20 is released. The molded part 23C of the separator at the bottom is widened. W2 is a size from the negative electrode end on the bottom side to an end of the separator 23. For example, measurement can be performed by using 3D shape measuring machine VR-3200 from Keyence.

In the bottom dropping test, a cell (a single battery) that has been charged in advance to an open circuit voltage of 4.20+/−0.05 V and for which an AC impedance (1 kHz) has been measured is dropped from a height of 1 m to a concrete floor along a vinyl chloride pipe three times, with a bottom side facing downward. After the cell is left as is for one hour after the test, an open circuit voltage and an impedance are measured. In a case where a decrease in voltage of 0.1 V or more or an increase in impedance of 10% or more is recognized, the cell is rejected.

In the impregnation quality test, an electrolyte solution is poured into an assembly cell, and the assembly cell is sealed, and then the assembly cell is left as is for one hour, and is impregnated. Then, the battery is disassembled rapidly, an electrode body is removed and is taken to pieces, and an impregnation state (a wetting state) of a separator is checked. A portion that is wet with the electrolyte solution appears black, and a portion that is not wet appears white. The impregnation state is checked for each of the two separators. If one or more separators have a non-wet area of 10% or more, the battery is rejected.

In Table 1, the sizes described below before forming are the same in Example 1, Example 2, and Example 3 and Comparative Example 1, Comparative Example 2, Comparative Example 3, and Comparative Example 4.

A separator (indicated as "septa" in the table) width Ws is calculated in such a way that Ws=negative electrode width Wa+W1+W2.

Positive electrode width Wc=18.8 (mm), Negative electrode width Wa=19.9 (mm)

Top-side separator width (amount of protrusion from negative electrode) W1=1.0 (mm)

A bottom-side separator width (an amount of protrusion from the negative electrode) W2 is set to a value that is different within a range from 1.7 (mm) to 4.5 (mm), and a value of W2/Ws is as described below.

Example 1: 0.08, Example 2: 0.14, Example 3: 0.17 Comparative Example 1: 0.07, Comparative Example 2: 0.18, Comparative Example 3: 0.18, Comparative Example 4: 0.08

Furthermore, a value of W2/W1 is as described below. Example 1: 1.70, Example 2: 3.50, Example 3: 4.40

Comparative Example 1: 1.60, Comparative Example 2: 4.50, Comparative Example 3: 4.50, Comparative Example 4: 1.70

The sizes described below after forming are the same in Example 1, Example 2, and Example 3 and Comparative Example 1 and Comparative Example 2.

Top-side separator width (Amount of protrusion from negative electrode) W3=1.0 (mm)

Bottom-side separator width (amount of protrusion from negative electrode) W4=0.9 (mm)

Electrode body length L=21.8 (mm)

In the case of Comparative Example 3, W3=1.0 (mm), W4=1.2 (mm), and L=22.1 (mm).

A value of W4/W3 (a ratio of a value of the bottom-side separator width and a value of the top-side separator width) is the same (0.90) in Example 1, Example 2, and Example 3 and Comparative Example 1 and Comparative Example 2, is 1.20 in Comparative Example 3, and is 1.00 in Comparative Example 4.

Furthermore, W4/W2 (a ratio of a value after forming and a value before forming of the bottom-side separator width) is as described below.

Example 1: 0.53, Example 2: 0.26, Example 3: 0.20

Comparative Example 1: 0.56, Comparative Example 2: 0.20, Comparative Example 3: 0.27, Comparative Example 4: 0.59

The bottom dropping test was conducted for 30 electrode bodies to obtain a result of evaluating a battery. In Example 1 to Example 3 and Comparative Example 2, 30 pieces are accepted; whereas in Comparative Example 1, 25 pieces are accepted, and in Comparative Example 4, 24 pieces are accepted. It should be understood that in Comparative Example 3, an electrode body length L after forming is excessively large, and an electrode body fails to be housed in the case 10. Therefore, a battery fails to be assembled.

The impregnation quality test was conducted for 30 electrode bodies, and the number of pieces that were determined to have satisfactory impregnation quality was checked. In Example 1 to Example 3 and Comparative Example 1, 30 pieces are accepted; whereas in Comparative Example 2, 26 pieces are accepted.

It is apparent from Table 1 that in order to achieve a battery that can improve dropping resistance of the battery with a bottom side (a side opposite to a tab) facing downward and causes an electrode plate to be satisfactorily impregnated with an electrolyte solution, it is requested that W2/Ws satisfy Formula 1 described above, and W4/W2 satisfy a relationship expressed by Formula 2.

Figure 5:
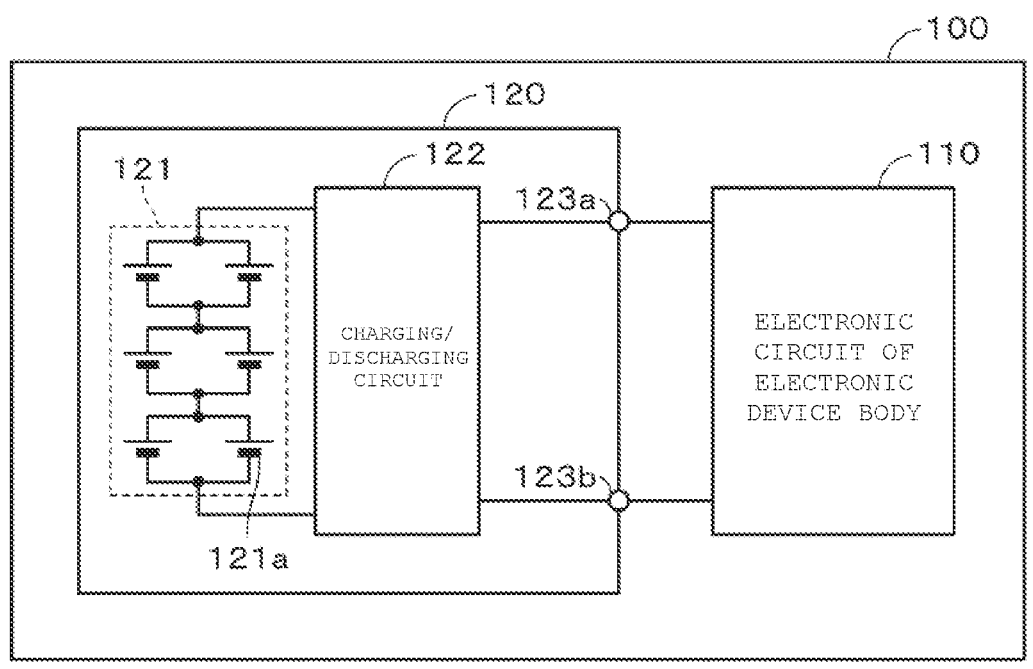
FIG. 5 is a block diagram for explaining an application example according to an embodiment of the present disclosuredisclosure.

An application example (an electronic device) of a secondary battery according to the present disclosure is described below with reference to FIG. 5. An electronic device 100 includes an electronic circuit 110 of an electronic device body and a battery pack 120.

The battery pack 120 is electrically connected to the electronic circuit 110 with a positive electrode terminal 123a and a negative electrode terminal 123b interposed therebetween. The electronic device 100 may have a configuration in which the battery pack 120 is attachable or detachable.

Examples of the electronic device 100 include laptop personal computers, tablet type computers, portable telephones (for example, smartphones or the like), portable information terminals (personal digital assistants: PDAs), display devices (liquid crystal displays (LCDs), electro luminescence (EL) displays, electronic paper, or the like), imaging devices (for example, digital still cameras, digital video cameras, or the like), audio devices (for example, portable audio players), game machines, codeless phone slave units, electronic books, electronic dictionaries, radios, headphones, navigation systems, memory cards, pacemakers, hearing aids, electric tools, electric shavers, refrigerators, air conditioners, televisions, stereos, water heaters, microwave ovens, dishwashers, washing machines, dryers, lighting equipment, toys, medical instruments, robots, road conditioners, traffic lights, and the like, but these are not restrictive.

The electronic circuit 110 includes, for example, a central processing unit (CPU), a peripheral logic unit, an interface, a storage, or the like, and controls the entirety of the electronic device 100.

The battery pack 120 includes a packed battery 121 and a charging/discharging circuit 122. The battery pack 120 may further include an exterior material (not illustrated) that houses the packed battery 121 and the charging/discharging circuit 122, as needed.

The packed battery 121 has a configuration in which a plurality of secondary batteries 121a is connected in series and/or in parallel. The plurality of secondary batteries 121a is connected, for example, in the arrangement of n parallel strings of m in series (n and m are positive integers). It should be understood that FIG. 5 illustrates an example in which six secondary batteries 121a are connected in the arrangement of 2 parallel strings of 3 in series (2P3S). As the secondary battery 121a, a secondary battery according to the present disclosure described above is used.

Here, a case where the battery pack 120 includes the packed battery 121 that includes a plurality of secondary batteries 121a is described, but a configuration in which the battery pack 120 includes one secondary battery 121a instead of the packed battery 121 may be employed.

The charging/discharging circuit 122 is a control unit that controls charging/discharging of the packed battery 121. Specifically, at the time of charging, the charging/discharging circuit 122 controls charging of the packed battery 121. On the other hand, at the time of discharging (that is, when the electronic device 100 is used), the charging/discharging circuit 122 controls discharging of the electronic device 100.

As the exterior material, a case that includes, for example, metal, polymer resin, a composite material thereof, or the like can be used. An example of the composite material is a laminate in which a metal layer and a polymer resin layer have been laminated.

The present disclosure is not limited to the embodiment described above of the present disclosure, and various variations or applications can be made without departing from the gist of the present disclosure.

For example, configurations, methods, processes, shapes, materials, numerical values, and the like described in the embodiment and the examples that have been described above are merely examples, and configurations, methods, processes, shapes, materials, numerical values, and the like that are different from these may be used, as needed. Furthermore, the configurations, the methods, the processes, the shapes, the materials, the numerical values, and the like in the embodiment and the examples that have been described above can be combined with each other without departing from the gist of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising:

an electrode body that has a winding structure, the electrode body including:

a positive electrode that includes a positive electrode lead, and has a belt shape;

a negative electrode that includes a negative electrode lead, and has the belt shape; and a separator that is provided between the positive electrode and the negative electrode, and has the belt shape; and an electrolyte solution, the electrode body and the electrolyte solution being accommodated in a case, wherein the positive electrode lead and the negative electrode lead are led out from a first end face of the electrode body, the electrode body includes a molded part of the separator, the molded part protruding from a second end face, and the electrode body satisfies Formula 1 and Formula 2:

$$0.08 \leq W2/Ws \leq 0.17; \text{ and} \qquad \text{(Formula 1)}$$

$$0.20 \leq W4/W2 \leq 0.53, \qquad \text{(Formula 2)}$$

wherein W2 is the amount of protrusion from the negative electrode of the separator on a side of the second end face, Ws is a width of the separator, and W4 is a size of the molded part from an end of the negative electrode to a bottom part excluding a thickness of a tape of the electrode body, wherein the molded part is formed by the separator that has been compressed in the winding axis direction, wherein compressing the separator is performed by applying a pressure in the winding axis direction from the second end face side towards the first end face side, and wherein the separator is bent in different directions about a center of the electrode body, including a first bend in which the separator bends towards the center of the electrode body and a second bend in which the separator bends away from the center of the electrode body in a longitudinal direction of the electrode body, the first bend changes a radial direction of the separator to extend in a first radial direction towards the center of the electrode body, and the second bend changes the radial direction of the separator to extend in a second radial direction opposite the first radial direction away from the center of the electrode body.

2. The battery according to claim 1, wherein the case includes at least one of steel, aluminum alloy steel, or stainless steel.

3. The battery according to claim 2, wherein at least one of the negative electrode lead or the positive electrode lead includes a resin layer.

4. The battery according to claim 2, wherein an exposed part of a current collector of the positive electrode or the negative electrode is disposed at an outermost periphery of the electrode body.

5. The battery according to claim 1, wherein at least one of the negative electrode lead or the positive electrode lead includes a resin layer.

6. The battery according to claim 5, wherein an exposed part of a current collector of the positive electrode or the negative electrode is disposed at an outermost periphery of the electrode body.

7. The battery according to claim 1, wherein an exposed part of a current collector of the positive electrode or the negative electrode is disposed at an outermost periphery of the electrode body.

8. The battery according to claim 1, wherein heat is applied to the separator without melting the separator while applying the pressure in the winding axis direction.

* * * * *